A. F. BECK.
TIRE AND RIM MANIPULATING APPLIANCE.
APPLICATION FILED OCT. 11, 1920.
1,402,471.
Patented Jan. 3, 1922.
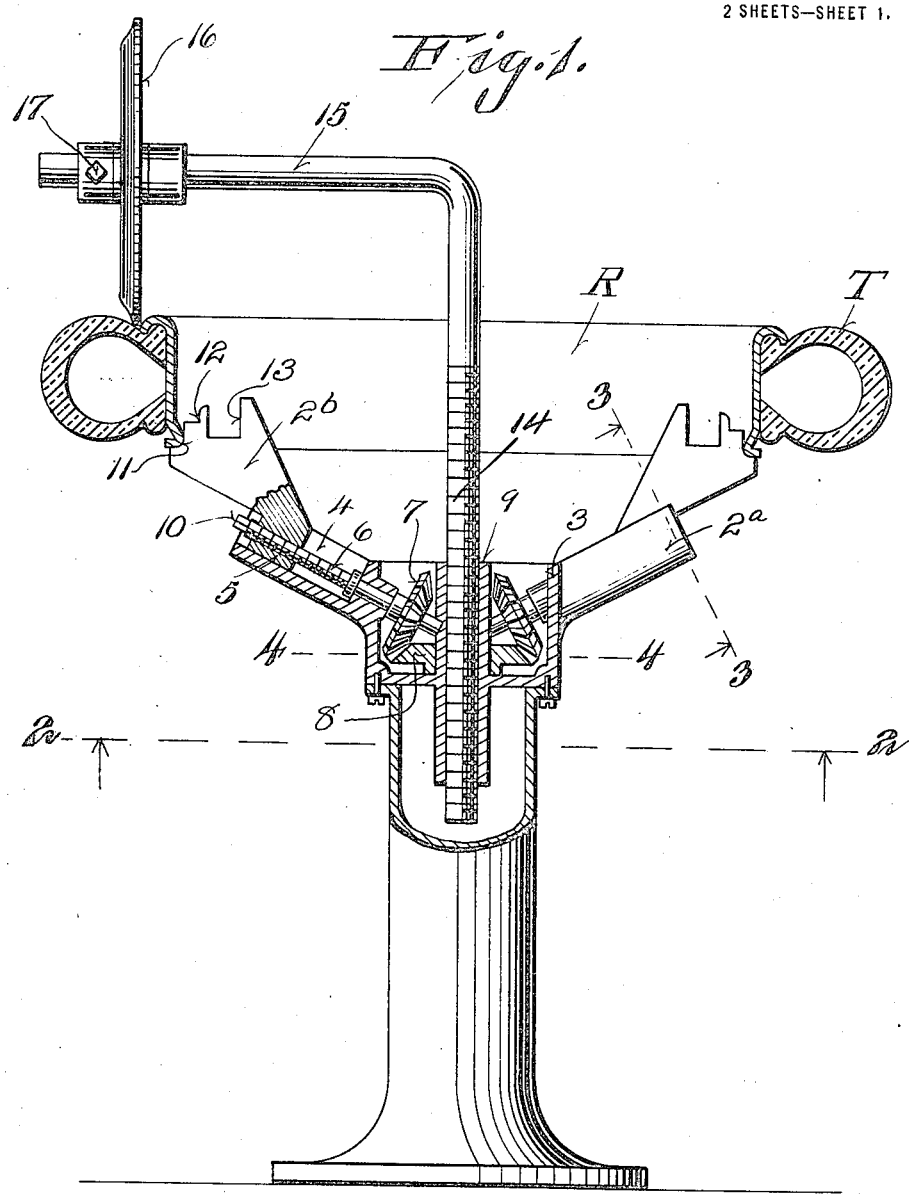
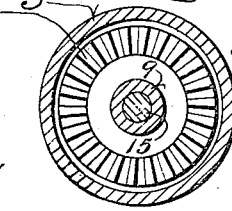
Inventor
Andrew F. Beck

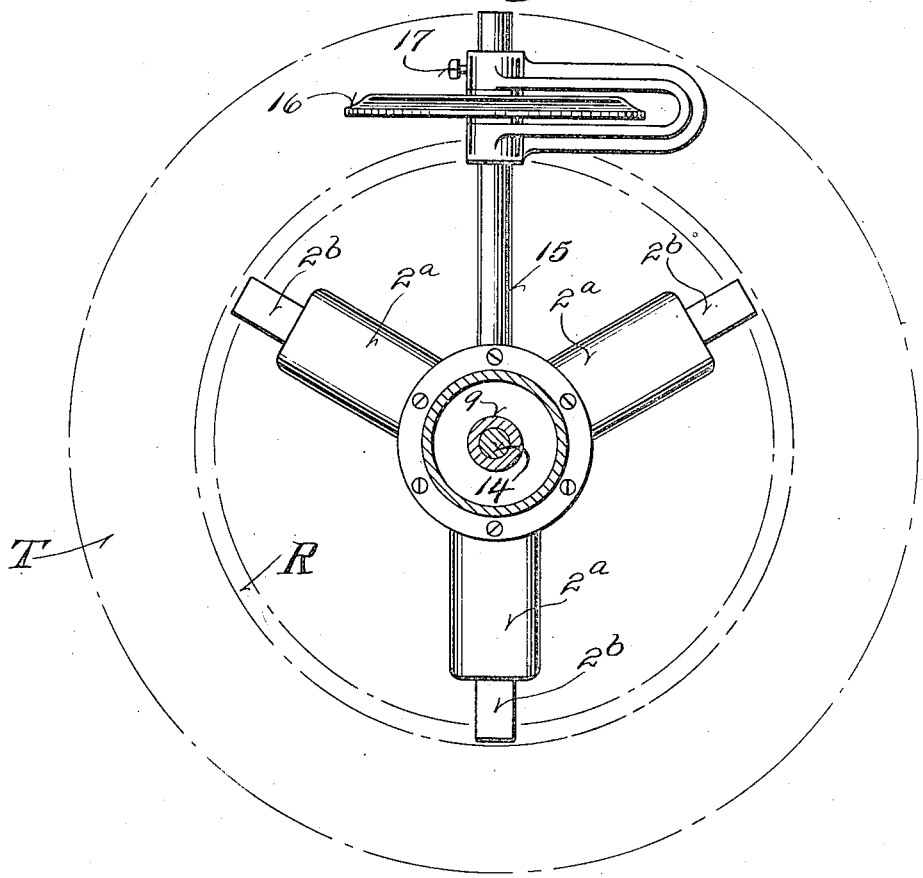
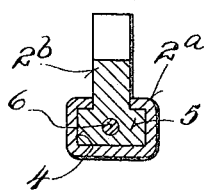

UNITED STATES PATENT OFFICE.

ANDREW F. BECK, OF MANITOWOC, WISCONSIN.

TIRE AND RIM MANIPULATING APPLIANCE.

1,402,471.     Specification of Letters Patent.     Patented Jan. 3, 1922.

Application filed October 11, 1920. Serial No. 416,139.

*To all whom it may concern:*

Be it known that I, ANDREW F. BECK, a citizen of the United States, and resident of Manitowoc, in the county of Manitowoc and State of Wisconsin, have invented certain new and useful Improvements in Tire and Rim Manipulating Appliances; and I do hereby declare that the following is a full, clear, and exact description thereof.

My invention relates to new and useful improvements in machines for changing vehicle tires on their carrying rims, the appliances being applicable to various types of tires and rims.

Heretofore in the use of machines of this character, it has been relatively difficult to quickly and easily remove a tire from a rim, owing to the obstruction of certain parts used in supporting the rim. An important object of this invention is, therefore, to arrange the parts of an appliance of this nature so that there will be no interferences of the same in the removal of a tire from its rim.

Another object of this invention is to provide a tire and rim supporting structure having radial rim receiving arms, which are positioned obliquely so that the same will be moved toward or away from the removing tool simultaneously with the radial movement.

An additional important object of the invention is to provide a tire or rim part removing device, which is capable of simultaneous rotary and helical movement so that it may be progressively fed into engagement with parts with which it is designed to contact.

With these general objects in view, the invention resides in the novel features of construction, combination and arrangement of parts, which will be hereinafter more particularly described and claimed.

In the accompanying drawings,

Figure 1 represents a side elevational view, partly in vertical section, of a tire and rim manipulating appliance constructed in accordance with the invention and showing one application of its use.

Figure 2 is a horizontal section taken substantially on the plane of the line 2—2 of Figure 1.

Figure 3 is a transverse section on the plane of the line 3—3 of Figure 1, and

Figure 4 is a detail horizontal section on the line 4—4 of Figure 1.

Referring more particularly to the drawings, it will be noted that the invention includes a stand or support 1 of suitable height having radially extending rim receiving arms, projecting obliquely upwardly from its upper end. These arms are directly carried by a housing member 3 and each of the same consists of a longitudinal guide portion $2^a$, preferably formed integrally with the housing and having a guide channel 4 receiving the extensible and retractable parts $2^b$. Each of the parts $2^b$ includes a screw block 5 which are slidable in the guide channels 4, they being shifted by the rotation of the feed screws 6.

As shown in Figure 1, each of the feed screws is journalled in the base of the parts $2^a$ of the arms and has a non-threaded portion extended into the housing 3 and provided with a beveled gear 7. The several gears of the feed screws 6 are meshed with a similar gear 8 journalled on a central vertically extending sleeve 9. One of the feed screws has a wrench or other suitable tool receiving end 10 which extends beyond its arm part $2^a$ for the reception of a wrench or the like, so that the feed screws may be simultaneously actuated, it being obvious that rotation of the feed screw which is provided with said end 10 is imparted to the other feed screws by means of the beveled gears 7 and 8.

The extreme free outer ends of the arm parts $2^b$ are provided with rim receiving seats 11 so arranged that when a rim R and a tire T are fitted thereon, the innermost annular portion of the latter will be positioned outwardly of the ends of the arms so that there will be no obstruction whatsoever to the removal of said tire downwardly from its rim. These seats 11 are designed primarily for the reception of a solid rim of the quick detachable, demountable type. Other seats 12 and 13 respectively are provided in the arm parts $2^b$ for other types of rims, for instance split clincher rims, which are expanded and contracted in pressing a tire thereon, or removing a tire therefrom. Whether the arms are used merely for supporting a tire and its rim, as in Figure 1, or for expanding and contracting the rim, they may be moved toward or away from the removing tool simultaneously with the radial movement, owing to their inclination.

The central sleeve 9 is also extended below the bottom of the housing 3, as well as above the same and is internally screw threaded for the reception of the threaded shank 14 of a tire and rim part manipulating device. This device, in addition to the shank 14, comprises a laterally or horizontally extended carrying arm 15, on which is rotatably and slidably mounted a wheel or disc 16, this wheel being movable to various points on the arm 15 and held against accidental sliding movement by a set screw 17.

When it is desired to remove the usual retaining ring or similar retaining part of a quick detachable, demountable rim, or when a tire is to be removed from a solid rim of this type, the wheel or disc 16 is used. For instance, its position on the arm 15 is adjusted to permit the periphery thereof to engage the suitable part of the tire or rim, whereupon the shank 14 is rotated in the proper direction and the wheel is caused to travel completely around the tire or rim, it being progressively fed downwardly during its rotation so that the tire or rim part will be likewise moved downwardly. Therefore, in view of the threaded connection between the shank 14 and the sleeve 9, the disc 16 is moved helically and also rotatably during the rotation of said shank 14. This obviously applies a progressively, increasingly strong pressure, and a very uniform pressure, on the tire or rim part which is in contact with the disc 16.

I claim:

1. A tire and rim manipulating appliance including a support, rim carrying arms projecting obliquely from the support, said arms having rim receiving seats in their free end portions to hold a rim, means for varying the length of said arms, and means for manipulating a rim or tire carried by the arms.

2. A tire and rim manipulating appliance including a support, rim carrying arms projecting from the support, and a rotatable manipulating member movable circumferentially along the edge of the tire or rim carried by the arms, said member progressively feeding in a direction to compress the tire or move the same, or a part of a rim with respect to the rest of the rim.

3. A tire and rim manipulating appliance including a support, rim carrying arms projecting from the support, and a manipulating member for engaging a tire or rim carried by the arms, said member having helical movement during its operation, whereby to progressively compress the tire or move the same, or a part of a rim, with respect to the rest of the rim.

4. A tire and rim manipulating appliance including a support, rim carrying arms projecting from the support, and a manipulating member for engaging a tire or rim carried by the arms, said member having simultaneously rotative and helical movement during its operation, whereby to successively engage the edge of a tire or rim part throughout its entire circumference and to progressively compress such tire or move the same, or a part of a rim, with respect to the rest of the rim.

In testimony that I claim the foregoing I have hereunto set my hand at Manitowoc, in the county of Manitowoc and State of Wisconsin.

ANDREW F. BECK.